(12) United States Patent
Liu

(10) Patent No.: US 12,140,843 B2
(45) Date of Patent: Nov. 12, 2024

(54) DRIVING CIRCUIT AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Hanxian Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/785,440

(22) PCT Filed: May 19, 2022

(86) PCT No.: PCT/CN2022/093930
§ 371 (c)(1),
(2) Date: Jun. 15, 2022

(87) PCT Pub. No.: WO2023/216296
PCT Pub. Date: Nov. 16, 2023

(65) Prior Publication Data
US 2024/0192560 A1 Jun. 13, 2024

(30) Foreign Application Priority Data

May 10, 2022 (CN) .......................... 202210504487.1

(51) Int. Cl.
*G09G 3/30* (2006.01)
*G02F 1/1362* (2006.01)
(Continued)

(52) U.S. Cl.
CPC .... *G02F 1/136286* (2013.01); *G02F 1/13452* (2013.01); *G09G 3/32* (2013.01); *G09G 2300/0426* (2013.01)

(58) Field of Classification Search
CPC ........................................................ G09G 3/32
See application file for complete search history.

(56) References Cited

U.S. PATENT DOCUMENTS 6,664,942 B1    12/2003  Kim
2016/0163633 A1*  6/2016  Jeong ................... G09G 3/3666
                                                                257/784

(Continued)

FOREIGN PATENT DOCUMENTS

CN    104977740 A    10/2015
CN    211788997 U    10/2020
(Continued)

OTHER PUBLICATIONS

International Search Report in International application No. PCT/CN2022/093930, mailed on Dec. 16, 2022.
(Continued)

*Primary Examiner* — Joseph R Haley
(74) *Attorney, Agent, or Firm* — Nathan & Associates; Menachem Nathan

(57) ABSTRACT

The present disclosure provides a driving circuit and a display device, where the driving circuit includes: data lines and gate lines disposed at a same layer; and a source driver and a gate driver located above the data lines and the gate lines, where the data lines are connected to the source driver, and the gate lines are connected to the gate driver.

19 Claims, 3 Drawing Sheets

(51) Int. Cl.
　　　*G02F 1/1345*　　　(2006.01)
　　　*G09G 3/32*　　　(2016.01)

(56) References Cited

U.S. PATENT DOCUMENTS

| | | | |
|---|---|---|---|
| 2021/0056882 A1* | 2/2021 | Lee | .......................... G09G 3/20 |
| 2023/0005963 A1* | 1/2023 | Chang | ................ H01L 29/7869 |

FOREIGN PATENT DOCUMENTS

| | | | |
|---|---|---|---|
| CN | 112071249 A | 12/2020 | |
| CN | 112563253 A | 3/2021 | |
| CN | 113257130 A | 8/2021 | |
| CN | 113675254 A | 11/2021 | |
| CN | 114072918 A | 2/2022 | |
| KR | 20000066493 A | 11/2000 | |

OTHER PUBLICATIONS

Written Opinion of the International Search Authority in International application No. PCT/CN2022/093930, mailed on Dec. 16, 2022.
Chinese Office Action issued in corresponding Chinese Patent Application No. 202210504487.1 dated Jun. 24, 2023, pp. 1-6.

\* cited by examiner

DRIVING CIRCUIT AND DISPLAY DEVICE

TECHNICAL FIELD

The present disclosure relates to a display technology field, and more particularly to a driving circuit and a display device.

BACKGROUND

At present, a driving Integrated Circuit (IC) of a liquid crystal panel is usually bound to the liquid crystal panel in a form of a Chip On film (COF). To reduce a product development cost, a Gate signal driving circuit for driving the liquid crystal panel is directly designed in the liquid crystal panel. Therefore, a Gate On Array (GOA) liquid crystal panel becomes a mainstream in the market. A GOA technology is to prepare a driving circuit for scanning lines on a substrate around a display area of the liquid crystal panel to replace an external IC to drive the scanning lines at various stages.

The GOA technology can reduce a bonding process of the external IC, but its disadvantage is that GOA circuits at both ends of the GOA liquid crystal panel limit a design of an ultra-narrow bezel. With the pursuit of a full-screen high resolution display, a COF driving scheme for introducing the Gate signal from a source side can implement an ultra-narrow bezel display panel.

However, the cost of the COF driving scheme for introducing the Gate signal from the source side is a relatively high.

Technical Problems

An objective of the present disclosure is to provide a driving circuit and a display device, so as to reduce a preparation cost of the driving circuit.

Technical Solutions to the Problems

In an aspect, an embodiment of the present disclosure provides a pixel driving circuit, comprising at least:
  data lines and gate lines; and
  a source driver and a gate driver located above the data lines and the gate lines, wherein the data lines are connected to the source driver, and the gate lines are connected to the gate driver;
  wherein the data lines are disposed at a same layer as the gate lines.

In some embodiments, the data lines further include a plurality of first data lines and a plurality of second data lines, wherein the plurality of first data lines pass through the gate driver, and the plurality of second data lines bypass the gate driver.

In some embodiments, the driving circuit further includes:
  a plurality of first conductive pads disposed at a same layer as the gate lines and covered by the gate driver, wherein each of the first conductive pads is connected to one of the gate lines.

In some embodiments, the driving circuit further includes:
  a substrate, wherein the data lines, the gate lines, and the first conductive pads are disposed on the substrate; and
  an insulation layer located on the substrate and covering the data lines and the gate lines.

In some embodiments, the plurality of first conductive pads are arranged at intervals, and the plurality of first data lines are located among the plurality of first conductive pads.

In some embodiments, at least one of the first data lines is disposed between two adjacent first conductive pads.

In some embodiments, three of the first data lines are disposed between every two of the first conductive pads.

In some embodiments, the driving circuit further includes an input signal binding region and an output signal binding region, wherein the source driver and the gate driver are located between the input signal binding region and the output signal binding region, and the gate driver is located on a side of the source driver close to the output signal binding region.

In some embodiments, the driving circuit further includes:
  a plurality of second conductive pads disposed at a same layer as the gate lines and covered by the gate driver;
  wherein, the first conductive pads are configured to transmit a gate output signal, and the second conductive pad are configured to transmit a gate input signal.

In another aspect, an embodiment of the present disclosure provides a display device, wherein the display device comprises at least:
  a display panel; and
  the driving circuit in any of the foregoing embodiments, wherein the driving circuit is bound to the display panel.

Beneficial Effects

Beneficial effects of the embodiments of the present disclosure are as follows: the embodiments of the present disclosure provide the driving circuit and the display device, wherein the driving circuit includes at least: the data lines and the gate lines disposed at a same layer; and the source driver and the gate driver located above the data lines and the gate lines, wherein the data lines are connected to the source driver, and the gate lines are connected to the gate driver. Since the data lines are disposed at a same layer as the gate lines, a single-layer thin film wiring design can be implemented. In this way, no via hole needs to be disposed during a subsequent binding process, and therefore the preparation cost can be saved or reduced.

BRIEF DESCRIPTION OF THE DRAWINGS

Technical solutions and other beneficial effects of the present disclosure are apparent below from detailed description of the embodiments of the present disclosure in combination with the accompanying drawings.

EMBODIMENTS OF THE PRESENT DISCLOSURE

Figure 1:
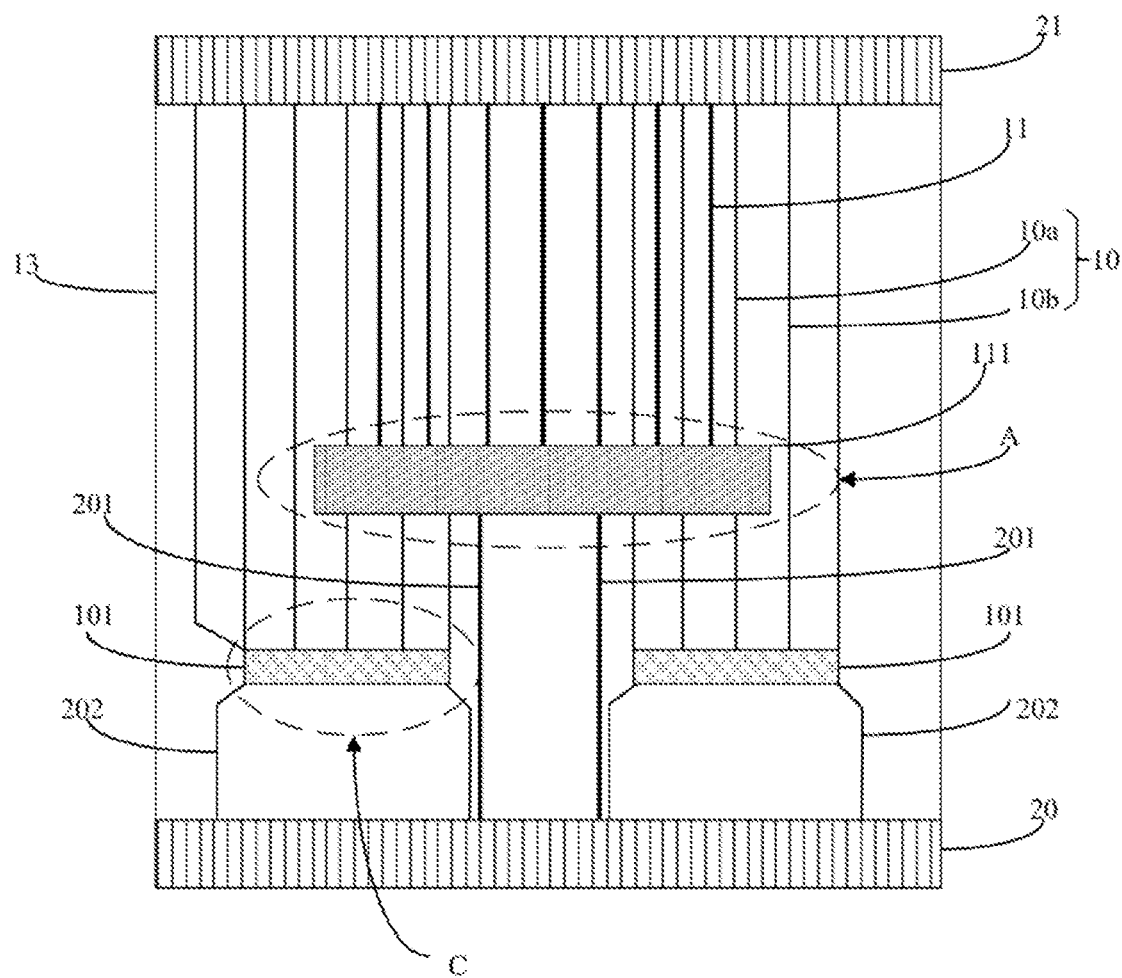
FIG. 1 is a schematic structural view of a driving circuit according to an embodiment of the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be understood that the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plurality" is two or more, unless otherwise specifically defined.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

Figure 2:
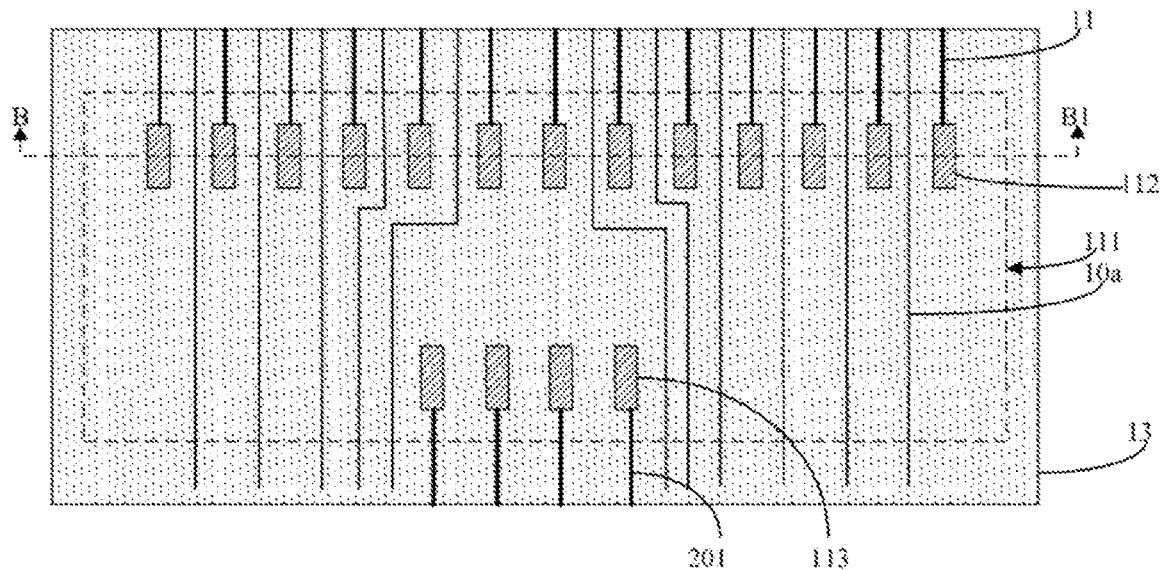
FIG. 2 is a perspective view of the driving circuit in FIG. 1 according to an embodiment of the present disclosure at an A point.
Figure 3:
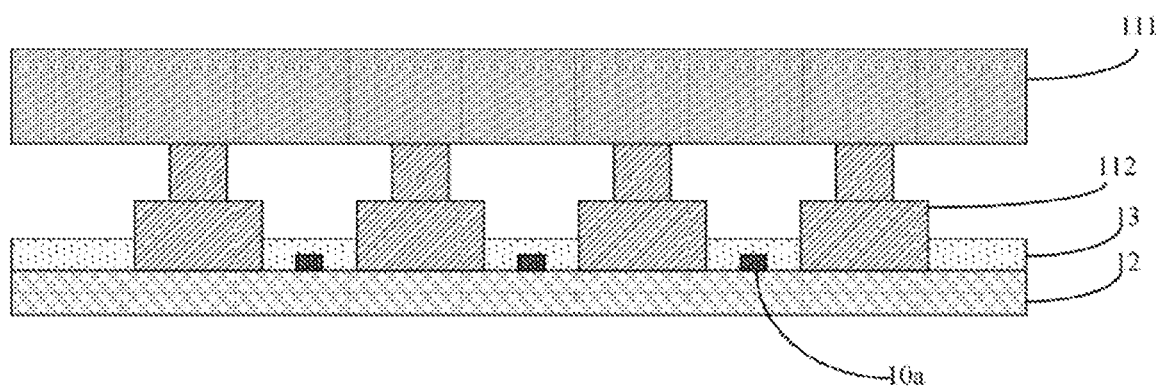
FIG. 3 is a schematic structural diagram of a cross section taken along the line B-B1 in FIG. 2 according to an embodiment of the present disclosure taken along a line.

Referring to FIG. 1 to FIG. 3, FIG. 1 is a schematic structural view of a driving circuit according to an embodiment of the present disclosure, FIG. 2 is a perspective view of the driving circuit in FIG. 1 according to an embodiment of the present disclosure at an A point; and FIG. 3 is a schematic structural diagram of a cross section taken along a line B-B1 in FIG. 2 according to an embodiment of the present disclosure.

A driving circuit 100 includes at least: data lines 10 and gate lines 11 that are disposed at a same layer; and a source driver 101 and a gate driver 111 that are located above the data lines 10 and the gate lines 11. The source driver 101 may be disposed at a same layer as the gate driver 111. As shown in FIG. 1, the data lines 10 are connected to the source driver 101, and the gate lines 11 are connected to the gate driver 111. It should be noted that in FIG. 1, the gate line 11 is indicated with a relatively thick black line, and the data line 10 is indicated with a relatively thin black line.

In the embodiment, the number of the source driver 101 and the number of the gate driver 111 may be set according to the number of the data lines 10 and the number of the gate lines 11. For example, the driving circuit 100 may include two source drivers 101 and one gate driver 111. In some embodiments, if the number of the data lines 10 is relatively small, one source driver 101 may be disposed. That is, the number of the source driver 101 and the number of the gate driver 111 are not limited in the present disclosure.

In some embodiments, a top view shape of both the gate driver 111 and the source driver 101 may be rectangular, and a length direction of the gate driver 111 is parallel to a length direction of the source driver 101.

In some embodiments, the driving circuit 100 may further include an input signal binding region 20 and an output signal binding region 21, where the source driver 101 and the gate driver 111 are located between the input signal binding region 20 and the output signal binding region 21, and the gate driver 111 is located on a side of the source driver 101 close to the output signal binding region 21. As shown in FIG. 1, two source drivers 101 are disposed side by side between the gate driver 111 and the input signal binding region 20, and two source drivers 101 are respectively disposed corresponding to both ends of the gate driver 111. The source driver 101 on the left is extended beyond the left end of the gate driver 111 toward the left in FIG. 1 (which refers to the orientation shown in FIG. 1), and the source driver 101 on the right is extended beyond the right end of the gate driver 111 toward the right in FIG. 1 (which refers to the orientation shown in FIG. 1).

In some embodiments, the driving circuit 100 may further include gate input signal lines 201 and source input signal lines 202. The gate input signal lines 201, the source input signal lines 202, the gate lines 11, and the data lines 10 are all disposed at a same layer. The gate input signal lines 201 are electrically connected to the gate driver 111, and the source input signal lines 202 are electrically connected to the source driver 101. It can be seen from a plane orientation of FIG. 1 that the gate input signal lines 201 are located between two source drivers 101 disposed side by side, and the source input signal lines 202 are located on a side of the source driver 101 away from the data lines 10. The gate input signal lines 201 and the source input signal lines 202 are introduced from the input signal binding region 20, to implement binding to a flexible circuit board. It may also be said that the gate input signal lines 201 are introduced from one side of the source input signal lines 202. In another aspect, the gate lines 11 and the data lines 10 are connected to the output signal binding region 21, to implement binding to the display panel. It should be noted that the number of the gate input signal lines 201 may be less than the number of the gate lines 11, and the number of the source input signal lines 202 may be less than the number of the data lines 10.

In some embodiments, as shown in FIG. 1 and FIG. 2, the data lines 10a may include or be divided into a plurality of first data lines 10a and a plurality of second data lines 10b, where, the first data lines 10a pass through a lower part of the gate driver 111, and the second data lines 10b bypass the gate driver 111, that is, the gate driver 111 does not cover the second data lines 10b. The first data line 10a corresponds to a position in which the source driver 101 is aligned longitudinally (which refers to an orientation shown in FIG. 1) with the gate driver 111, and further the first data lines 10a may pass through the gate driver 111. The second data lines 10b corresponds to a portion of the source driver 101 beyond the gate driver 111, and further the second data lines 10b may bypass or not pass through the gate driver 111.

In some embodiments, as shown in FIG. 2, the driving circuit 100 may further include a plurality of first conductive pads 112 disposed at a same layer as the gate lines 11, where the gate lines 11 are electrically connected to the gate driver 111 (represented by a dashed box in FIG. 2) by the plurality of first conductive pads 112. Specifically, each of the gate lines 11 is connected to one of the first conductive pads 112, and the gate driver 111 covers or is bound to the plurality of first conductive pads 112, so as to implement electrical connection between the gate lines 11 and the gate driver 111. Each of the gate lines 11 is led out from a side surface of one of the first conductive pads 112, for example, from an upper part (an orientation shown in FIG. 2) of the first conductive pad 112.

With reference to FIG. 2 and FIG. 3, the plurality of first conductive pads 112 are arranged at intervals along a length direction of the gate driver 111, and the first data lines 10a are located among the plurality of first conductive pads 112. In some embodiments, at least one of the first data lines 10a is disposed between two adjacent first conductive pads 112. For example, one of the first data lines 10a is disposed between two adjacent first conductive pads 112. Therefore, the gate line 11 and the first data line 10a are alternately led out from the gate driver 111.

In some embodiments, two, three, four, or five of the first data lines 10a are disposed between two adjacent first conductive pads 112. In some other embodiments, three of the first data lines 10a are disposed between every two of the first conductive pads 112. That is, the first conductive pads 112 and the first data lines 10a are arranged along the length direction of the gate driver 111 in an order of: two first conductive pads 112, three first data lines 10a, two first conductive pads 112, and three first data lines 10a. Therefore, an arrangement of the first conductive pads 112 (or the gate lines 11) and the first data lines 10a is not limited in the present disclosure.

In some embodiments, as shown in FIG. 2, the driving circuit 100 may further include a plurality of second conductive pads 113, where the second conductive pads 113 are disposed at a same layer as the first conductive pads 112, and the gate driver 111 covers or is bound to the first conductive pads 112 and the second conductive pads 113. Each of the second conductive pads 113 is connected to one of the gate input signal lines 201. Specifically, the gate input signal line 201 is led out from a lower part (which refers to an orientation shown in FIG. 2) of the second conductive pad 113, so that the gate input signal line 201 can be electrically connected to the gate driver 111. Since the number of the gate input signal lines 201 is less than the number of the gate lines 11, the number of the second conductive pads 113 is less than the number of the first conductive pads 112.

The second conductive pads 113 are located on a side of the first conductive pads 112 close to the input signal binding region 20, the second conductive pads 113 are configured to transmit a gate input signal, and the first conductive pads 112 are configured to transmit a gate output signal. A process of transmitting the gate signals is as follows: a gate input signal generated by a flexible circuit board is introduced from the input signal binding region 20, and is transmitted to the gate driver 111 through the gate input signal line 201 and the second conductive pad 113 sequentially; after processing the gate input signal, the gate driver 111 generates a gate output signal, and the gate output signal is transmitted to the first conductive pad 112; and finally, the first conductive pad 112 transmits the gate output signal to the gate line 11, so as to implement pixel driving for the display panel.

In some embodiments, as shown in FIG. 3, the driving circuit 100 may further include a substrate 12, where a material of the substrate 12 may include a polyimide. The data lines 10, the gate lines 11, and the first conductive pads 112 are all located on the substrate 12, and the second conductive pads 113, the third conductive pads 102, the fourth conductive pads 103, the source input signal lines 202, and the gate input signal lines 201 may also be all located on the substrate 12.

The driving circuit 100 may further include an insulation layer 13 located on the substrate 12 and covering the data lines 10 and the gate lines 11. Therefore, it can be avoided that a short circuit occurs between the gate line 11 and the data line 10 disposed at a same layer. It may be understood that since the gate lines 11, the data lines 10, the gate input signal lines 201, and the source input signal lines 202 (which may be collectively referred to as a circuit layer) are all disposed at a same layer, the insulation layer 13 covers the gate lines 11, the data lines 10, the gate input signal lines 201, and the source input signal lines 202. Although the first conductive pads 112 are disposed at a same layer as the circuit layer, a height of each of the first conductive pads 112 is relatively high. Therefore, the insulation layer 112 does not cover the first conductive pads 112. It may also be said that the first conductive pads 112 are partially located in the insulation layer 112.

A material of the insulation layer 13 may include an oxide such as silicon oxide or silicon nitride. The substrate 12, the insulation layer 13, and the circuit layer (including the gate lines 11, the data lines 10, the gate input signal lines 201, and the source input signal lines 202) may be collectively referred to as a single-layer film. The gate driver 111 and the source driver 101 are bound to the single-layer film, which thus may be referred to as a Chip On film (COF). It should be noted that the insulation layer 13, the first data lines 10a, the gate lines 11, and the gate input signal lines 201 are shown in a perspective view of the driving circuit in FIG. 2, and the first data lines 10a, the gate lines 11, and the gate input signal lines 201 are not shown in a top view of the driving circuit because they are covered by the insulation layer 13.

Figure 4:
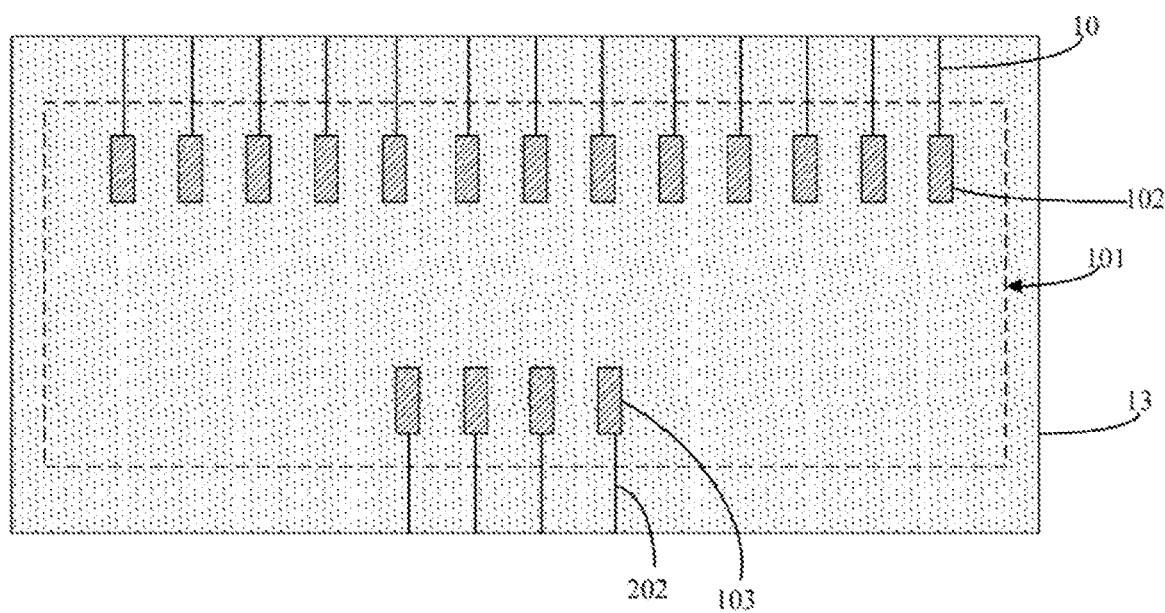
FIG. 4 is a perspective view of the driving circuit in FIG. 1 according to an embodiment of the present disclosure at a C point.

Referring to FIG. 4, which is a perspective view of the driving circuit in FIG. 1 according to an embodiment of the present disclosure at a C point.

The driving circuit 100 may further include a plurality of third conductive pads 102 and a plurality of fourth conductive pads 103, where the third conductive pads 102, the fourth conductive pads 103, the data lines 10, and the source input signal lines 202 are disposed at a same layer. The source driver 101 (represented by a dashed box) covers or is bound to the third conductive pads 102 and the fourth conductive pads 103, and the fourth conductive pads 103 are located on a side of the third conductive pads 102 close to the input signal binding region. The third conductive pads 102 are configured to transmit a source output signal, and the fourth conductive pads 103 are configured to transmit a source input signal. Each of the third conductive pads 102 is connected to one of the data lines, and each of the fourth conductive pads 103 is connected to one of the source input signal lines 202. Since the number of the source input signal lines 202 is less than the number of the data lines 10, the number of the fourth conductive pads 103 is less than the number of the third conductive pads 102. A process of transmitting the source signals is as follows: a source input signal generated by a flexible circuit board is introduced from the input signal binding region 20, and is transmitted to the gate driver 101 through the source input signal line 202 and the fourth conductive pad 103 sequentially; after processing the source input signal, the source driver 101 generates a source output signal, and the source output signal is transmitted to the third conductive pad 102; and finally, the third conductive pad 102 transmits the source output signal to the data line 10, so as to implement pixel driving for the display panel.

The driving circuit 100 provided in embodiments of the present disclosure includes: the data lines 10 and the gate lines 11 disposed at a same layer; and the source driver 101 and the gate driver 111 located above the data lines 10 and the gate lines 11, where the data lines 10 are connected to the source driver 101, and the gate lines 11 are connected to the gate driver 111. Since the data lines 10 are disposed at a same layer as the gate lines 11, a single-layer thin film wiring design can be implemented. In this way, no via hole needs to be disposed during a subsequent binding process, and therefore the production cost can be saved or reduced.

An embodiment of the present disclosure further provides a display device, including the driving circuit 100 in any of the foregoing embodiments and a display panel, where the driving circuit 100 is bound to the display panel. Specifically, the output signal binding region 21 of the driving circuit 100 is bound to the display panel. The display panel may be a liquid crystal display panel or another type of display panel. The display device has a same beneficial effect as the driving circuit 100, and details thereof are not described repeatedly herein.

The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A driving circuit, comprising at least:
   data lines and gate lines; and
   a source driver and a gate driver located above the data lines and the gate lines, wherein the data lines are connected to the source driver, and the gate lines are connected to the gate driver;
   wherein the data lines are disposed at a same layer as the gate lines,
   wherein the data lines further comprise a plurality of first data lines and a plurality of second data lines, wherein the plurality of first data lines pass through the gate driver, and the plurality of second data lines bypass the gate driver.

2. The driving circuit of claim 1, wherein the driving circuit further comprises:
   a plurality of first conductive pads disposed at a same layer as the gate lines and covered by the gate driver, wherein each of the first conductive pads is connected to one of the gate lines.

3. The driving circuit of claim 2, wherein the driving circuit further comprises:
   a substrate, wherein the data lines, the gate lines, and the first conductive pads are disposed on the substrate; and
   an insulation layer located on the substrate and covering the data lines and the gate lines.

4. The driving circuit of claim 2, wherein the plurality of first conductive pads are arranged at intervals, and the plurality of first data lines are located among the plurality of first conductive pads.

5. The driving circuit of claim 4, wherein at least one of the first data lines is disposed between two adjacent first conductive pads.

6. The driving circuit of claim 4, wherein three of the first data lines are disposed between every two of the first conductive pads.

7. The driving circuit of claim 1, wherein the driving circuit further comprises an input signal binding region and an output signal binding region, wherein the source driver and the gate driver are located between the input signal binding region and the output signal binding region, and the gate driver is located on a side of the source driver close to the output signal binding region.

8. The driving circuit of claim 2, wherein the driving circuit further comprises:
   a plurality of second conductive pads disposed at a same layer as the gate lines and covered by the gate driver;
   wherein, the first conductive pads are configured to transmit a gate output signal, and the second conductive pads are configured to transmit a gate input signal.

9. The driving circuit of claim 1, wherein the driving circuit further comprises:
   a plurality of third conductive pads and a plurality of fourth conductive pads disposed at a same layer as the data lines and covered by the source driver;
   wherein, the third conductive pads are configured to transmit a source output signal, and the fourth conductive pads are configured to transmit a source input signal.

10. A display device, comprising at least:
    a display panel; and
    a driving circuit comprising at least:
    data lines and gate lines; and
    a source driver and a gate driver located above the data lines and the gate lines, wherein the data lines are connected to the source driver, and the gate lines are connected to the gate driver;
    wherein the data lines are disposed at a same layer as the gate lines,
    wherein the driving circuit is bound to the display panel,
    wherein the data lines further comprise a plurality of first data lines and a plurality of second data lines, wherein the plurality of first data lines pass through the gate driver, and the plurality of second data lines bypass the gate driver.

11. The display device of claim 10, wherein the driving circuit further comprises:
    a plurality of first conductive pads disposed at a same layer as the gate lines and covered by the gate driver, wherein each of the first conductive pads is connected to one of the gate lines.

12. The display device of claim 11, wherein the driving circuit further comprises:
    a substrate, wherein the data lines, the gate lines, and the first conductive pads are disposed on the substrate; and
    an insulation layer located on the substrate and covering the data lines and the gate lines.

13. The display device of claim 11, wherein the plurality of first conductive pads are arranged at intervals, and the plurality of first data lines are located among the plurality of first conductive pads.

14. The display device of claim 13, wherein at least one of the first data lines is disposed between two adjacent first conductive pads.

15. The display device of claim 13, wherein three of the first data lines are disposed between every two of the first conductive pads.

16. The display device of claim 10, wherein the driving circuit further comprises an input signal binding region and an output signal binding region, wherein the source driver and the gate driver are located between the input signal binding region and the output signal binding region, and the gate driver is located on a side of the source driver close to the output signal binding region.

17. The display device of claim 11, wherein the driving circuit further comprises:
   a plurality of second conductive pads disposed at a same layer as the gate lines and covered by the gate driver;
   wherein, the first conductive pads are configured to transmit a gate output signal, and the second conductive pads are configured to transmit a gate input signal.

18. The display device of claim 10, wherein the driving circuit further comprises:
   a plurality of third conductive pads and a plurality of fourth conductive pads disposed at a same layer as the data lines and covered by the source driver;
   wherein, the third conductive pads are configured to transmit a source output signal, and the fourth conductive pads are configured to transmit a source input signal.

19. A driving circuit, comprising at least:
   data lines and gate lines; and
   a source driver and a gate driver located above the data lines and the gate lines, wherein the data lines are connected to the source driver, and the gate lines are connected to the gate driver;
   wherein the data lines are disposed at a same layer as the gate lines,
   wherein the driving circuit further comprises: a plurality of third conductive pads and a plurality of fourth conductive pads disposed at a same layer as the data lines and covered by the source driver;
   wherein, the third conductive pads are configured to transmit a source output signal, and the fourth conductive pads are configured to transmit a source input signal.

* * * * *